United States Patent Office 3,156,899
Patented Nov. 10, 1964

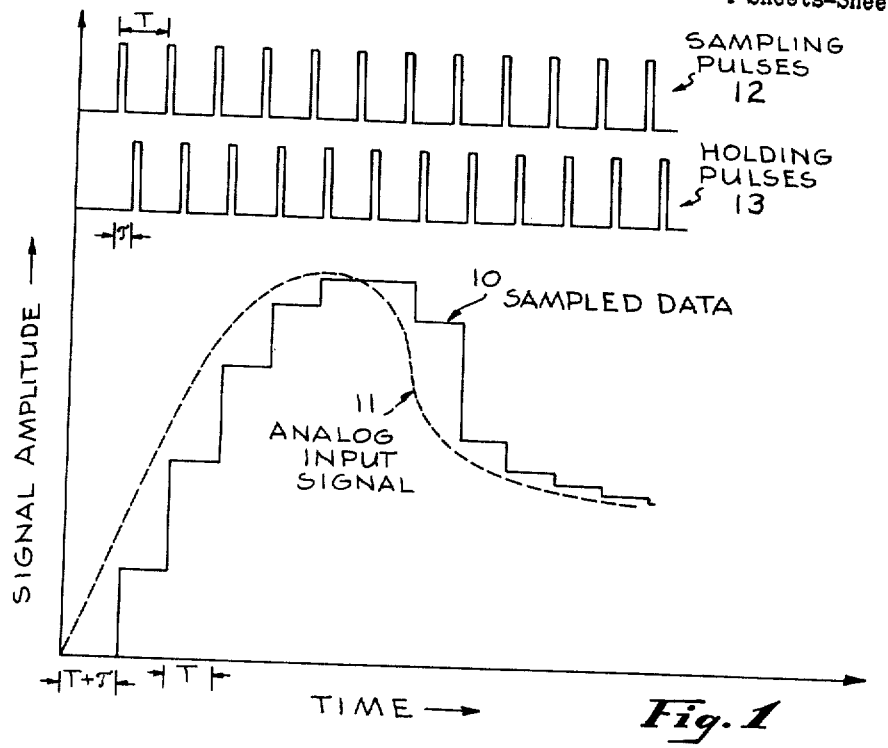
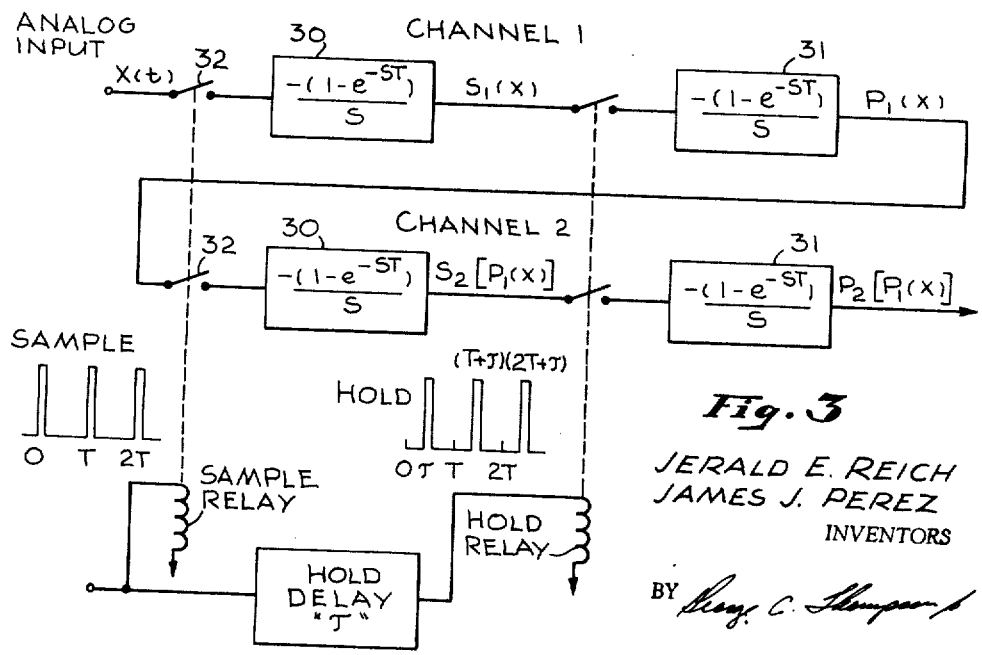

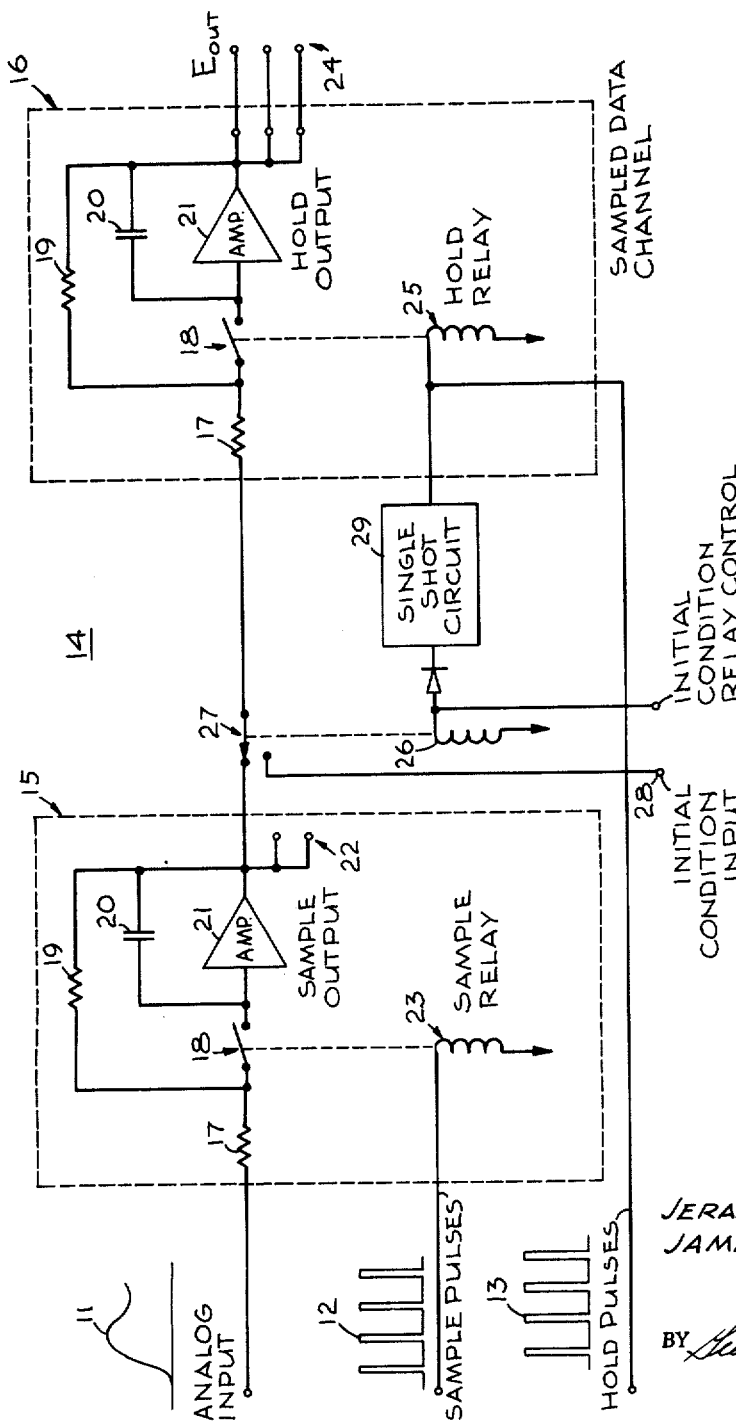

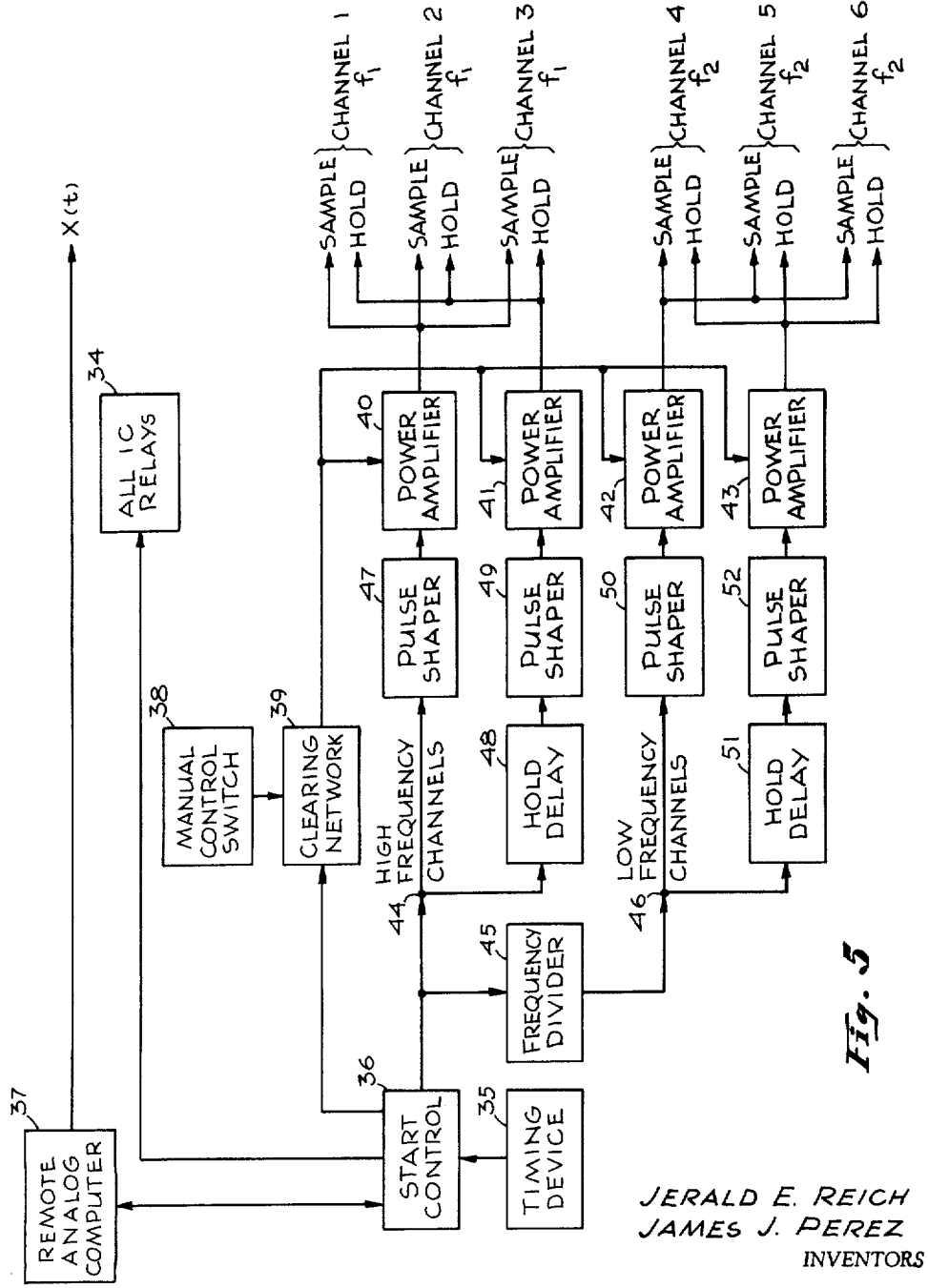

3,156,899
SAMPLED DATA SIMULATOR CONTROL SYSTEM
Jerald E. Reich, Lynwood, and James J. Perez, Torrance, Calif., assignors to Space Technology Laboratories, Inc., Redondo Beach, Calif., a corporation of Delaware
Filed May 24, 1962, Ser. No. 197,582
6 Claims. (Cl. 340—172.5)

This invention relates generally to sample data systems and, more particularly, to a sampled data simulator for simulating control system problems containing both continuous and sampled information by using sample and hold techniques.

A sampled data system is defined as a system in which data appears at a point or plurality of points and then presented in a discontinuous manner. The process which converts the continuous input data into a data-hold sequence is called the sample process. This invention is concerned with the control and function of a plurality of discreet sampled data channels and the interconnection of these channels to perform tasks presently being performed on general purpose digital computers. For example, in the design and manufacture of complex control systems it is the practice to use general purpose digital computers in combination with continuous input elements to simulate the operation of a complete system. A sampled data simulation, using analog-to-digital converters, is used to feed a digital computer, which is connected to a digital-to-analog converter. The prior art use of general purpose digital computers as a storage device with delayed output is extremely wasteful of resources and, of course, expensive.

In this invention individual sample-hold channels are used directly in combination with the simulating analog input device. The controlling, synchronization and operation of the sample-hold channels in combination with the analog input devices is the subject matter of the present invention.

Further objects and advantages will be made more apparent by referring now to the accompanying drawings wherein:

FIG. 1 is a graph illustrating a continuous data input signal with sampling and hold pulses;

FIG. 2 is a schematic diagram illustrating a sample and hold channel;

FIG. 3 is a block diagram of a pair of channels interconnected to perform a basic computer connection known as a transport delay;

FIG. 5 is a block diagram illustrating a sampled data control system.

Figure 4:
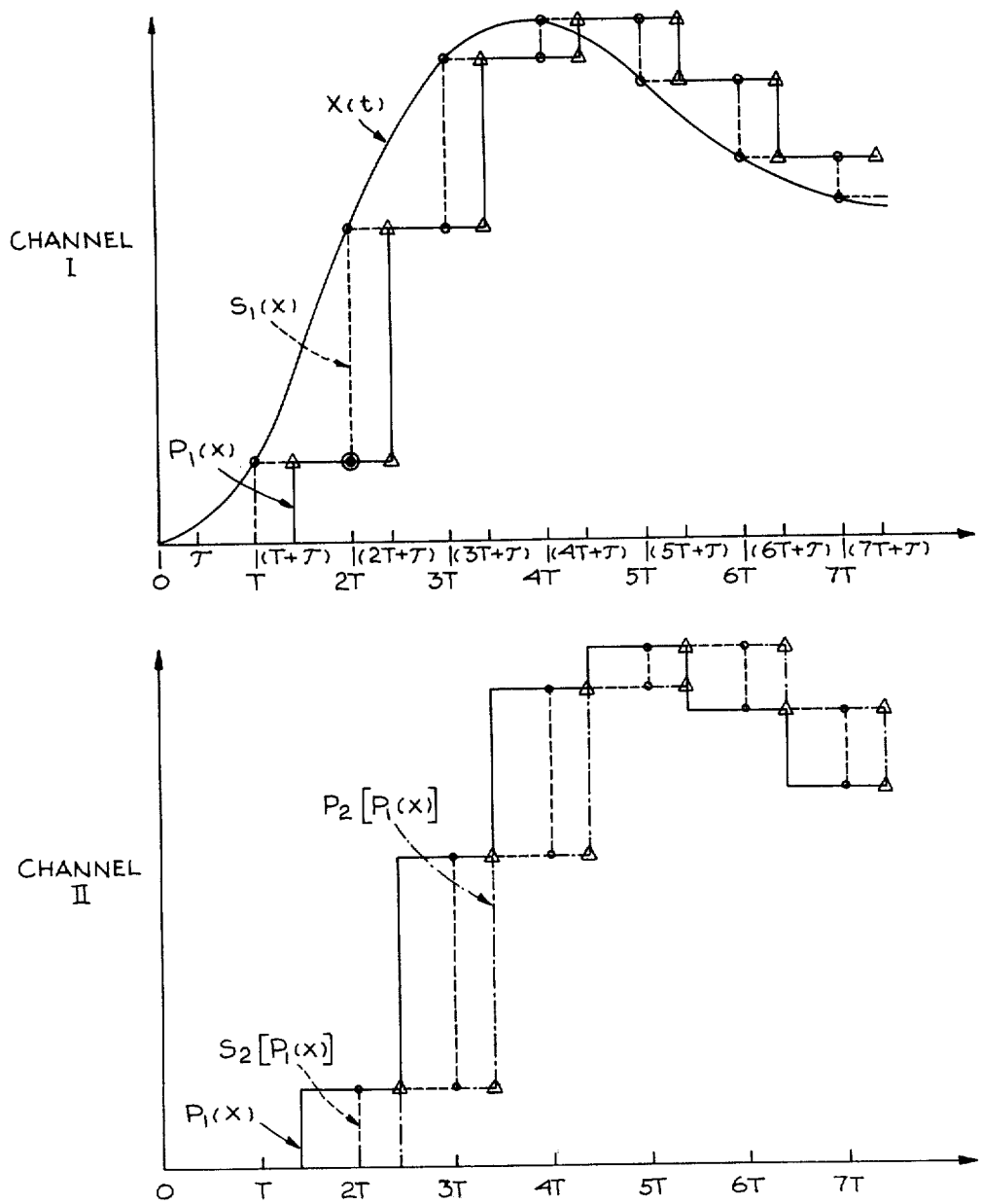
FIG. 4 is a graph illustrating the delay obtained by the system of FIG. 3.

Referring now to FIG. 1, there is shown a sampled data curve 10 and the relation it bears to a continuous analog input signal 11. The sampled data curve 10 illustrates the basic requirement of a sampled data channel having a zero order hold, which is to sample a continuous input signal periodically in order to produce an output signal that changes in magnitude in a staircase-step manner at the sampling times. The sampled data curve 10 is obtained by controlling a sample data channel, illustrated in FIG. 2, with a train of sample pulses 12 having a period of time T, followed by a train of delay hold pulses 13, sometimes called present pulses. The hold pulses 13 are of the same frequency as the sampling pulses 12 but delayed therefrom by a fixed time $\tau$. The delay time $\tau$ is made longer than the width of an individual sampling pulse but less than the period time between successive sampling pulses. This is to insure the completion of the sampling step before sending a hold pulse and also that a complete sample and hold operation is completed before the next subsequent sampling pulse is transmitted. The operation and control of the sampled data channel by the sampling pulses 12 and the hold pulses 13 will be explained in connection with FIG. 2.

Referring now to FIG. 2, there is shown a representative sampled data channel 14, comprising a sampling circuit 15 and a holding circuit 16. The sampling circuit 15 and the hold circuit 16 are zero holding circuits connected in cascade. The sampling circuit 15 is connected to the continuously varying analog input signal 11 and is arranged to sample the input signal; whereas, the hold circuit 16 is connected to the output of the sampling circuit and is arranged to hold and store the sampled information for presentation. The sampled data channel being described utilizes high speed relays operating at the sampling rate, which in the preferred embodiment are limited to a maximum sampling frequency of 10 cycles per second. The design of the sampling circuit 15 and the hold circuit 16 is within the state of the art and provides satisfactory operation in the desired frequency range of .05 to 10 cycles per second. The sampling circuit 15 consists of a resistor 17 connected at one end to the continuously varying analog input signal 11 and at the other end to a junction of a relay-operated switch 18 and a second resistor 19 that may be the same as resistor 17. A high gain amplifier 21 is connected across the capacitor 20, forming a junction at one end that is connected to the other side of switch 18. The junction of resistor 19, capacitor 20, and amplifier 21 forms the output of the sampling circuit, as represented by terminals 22. The amplifier 21 is arranged to hold the charge on capacitor 20 while the switch 18 is opened. The switch 18 is operated by a sampling relay 23 in response to the sampling pulses 12. When switch 18 closes, the circuit becomes a first order lag and the output terminals 22 charge to the amplitude of the analog input signal 11 in an exponential manner. The lag time constant is equal to the value of RC, with R value being that of resistor 19 and the C value being that of capacitor 20. The ratio of the feedback resistor 19 to the input resistor 17 determines the gain of the sample amplifier circuit. When switch 18 is opened, the amplifier 21 is effectively an integrator with no input signal, thereby keeping the output signal at terminals 22 equal to the charge on the capacitor 20. The amplifier 21 will hold the charge on the capacitor 20 until the sampling relay 23 is again operated, allowing the capacitor to charge to a new voltage level. The RC value can be minimized until it is equal to the rise time of the amplifier 21. The closure time of contacts 18 was selected to be a factor of ten greater than the RC time constant selected. The hold circuit 16 is constructed of identical elements just described for the sampling circuit 15 and, hence, similar numbers for identical parts are used. The output of the hold circuit 16 is available at terminals 24. The hold relay 25 is similar to the sampling relay 23 and is controlled by the hold pulses 13. In many operations the analog input signal does not start at zero due simply to the problem being sampled. Before a simulation is begun it is necessary, therefore, to read the initial condition signal into the hold amplifier 16. This is accomplished by means of a relay 26 that controls a single pole double throw switch 27. The impulsing of relay 26 not only transfers switch 27 to an initial condition input terminal 28 but also controls a single shot multivibrator circuit 29 which impulses the hold relay 25. The impulsing of the hold relay 25 closes switch 18, thereby allowing the hold circuit 16 to sample and hold the initial condition signal being fed from input 28. As will be described later, a preset program control will impulse relay 26 and release the relay control signal prior to the starting of the computer.

In operation of the complete sampled data channel, the output from the sampling circuit 15 is stored in the hold circuit 16 to prevent loss of the sampled data until the next sample pulse 12 operates the sample relay 23. Transfer of the information from the sample circuit 15 to the hold circuit 16 is achieved by means of the delay $\tau$ existing between the hold pulse 13 and the sampling pulse 12. In the preferred embodiment the hold signal is achieved by simply delaying the sampling signal the desired amount.

The timed relationship between the sampling pulses fed to relay 23 and the holding pulses fed to relay 25 insures that switch 18 of the hold circuit 16 will be opened while the sampling circuit is sampling the input signal 11 and that switch 18 of the sampling circuit 15 will be opened while the hold circuit 16 is receiving the signal sampled by the sampling circuit 15. The delay $\tau$ between the sampling signal 12 and the holding signal 13 may be varied a factor of ten greater than the RC time to a maximum determined by the period of sampling pulses. Individual channels may be cascaded to obtain a sample period delay per channel T plus a small hold relay $\tau$. The advantages of using separate sample data channels are more pronounced in solving high order difference equations and in situations involving several sampled data simulations being run concurrently. For example, a method of solving difference equations may consist of cascading $N+1$ sampled hold channels to thereby obtain N sampling period transport delay. Since all of these sampling operations must be completed in a small fraction of the total sampling period, the maximum sampling rate is dependent on the order of the difference equation being mechanized.

Referring now to FIG. 3, there is shown a transport delay of N sampling periods obtained by cascading $N+1$ sampled data channels. Wave forms illustrating the transmission of an arbitrary wave through channel one and channel two are more fully illustrated in FIG. 4. It will also be apparent that sampling by channel two of the hold signal in channel one results in a one period transport delay. Each of the channels one and two contains identical sampling circuits 30 and holding circuits 31. During the $n^{th}$ sampling period of T seconds duration, each sample circuit output consists of a varying component occurring when the sampling switch 32 is closed and a constant value when the switch is opened. Thus, for the sampling amplifier:

(1) $\quad y_s(t) = y_{1s}(t) + y_{2s}(t)$, for $nT < t < nT+T$

The differential equations describing the components of the amplifier output are:

(2a) $\quad RC\dot{y}_{1s}(t) + y_{1s}(t) = x(t)$ for $nT < t < nT+h$ (2b) $\quad y_{2s}(t) = y_{1s}(t=nT+h)$ for $nT+h < t < nT+T$ Considering the case in which $T \gg RC$ and $h$, with $$h/RC = \text{constant}$$

the Laplace transform of the sample amplifier output then becomes (3) $\quad Y_s(s) = \left(\frac{1-e^{-sT}}{s}\right) X(s)$ where X indicates the Laplace transform of a sampled quantity.

Sampling of the sample amplifier output by the hold amplifier is delayed by $\tau$ seconds. Inspection of the waveforms of signal transmission through a sampled hold channel in FIG. 4 shows that the hold output is delayed from the sample output by the hold delay $\tau$. Thus:

(4) $\quad Y_v(s) = \left(\frac{1-e^{-sT}}{s}\right) e^{-\tau s} X(s)$

The input quantity $x(t)$ may be a continuous time function or may be the output of a sample or hold amplifier zero order hold. The sample amplifier output appears at $s$, while $p$ is the hold amplifier output.

The following notation is introduced to describe the operation characteristics of the sample hold channel, as illustrated in FIG. 4.

(5) $S[x(nT)] = S(x) =$ sampled and held value of a channel input, $x$ at the $n^{th}$ sampling instant (6) $P[x(nT)] = P(x) =$ sampled, held, and delayed (by $\tau$ seconds) value of the channel input, $x$ at the $n^{th}$ sampling instant.

The explanation will be more readily apparent when it is recognized that the z-transform of the sampled time function is the Laplace transform of that function with the Laplace operator replaced by the identity:

$$s = \frac{\ln(z)}{T}$$

The sampling and hold operators defined by Equations 5 and 6 have the following z-transform properties when the sampled hold channel is not followed by a continuous transfer function as follows:

(a) the sampled circuit output with $X(z)$ input (7) $\quad S[X(z)] = X(z)$ (b) the hold output with $X(z)$ input and hold delay of $\tau$ seconds (8) $\quad P[X(z)] = z^{-\tau/T} X(z)$ (c) the sampling circuit output with $P[X(z)]$ input (9) $\quad S\{P[X(z)]\} = z^{-1} X(z)$ Referring now to FIG. 5, there is shown a block diagram of a control system for operating two groups of sample and hold channels at different frequencies and in synchronism with a remote analog computer. In the preferred embodiment a timing device 35 generates a train of clock pulses at the highest repetition sampling frequency desired. The input for the lower frequency channel is obtained by dividing the higher frequency by some integral number, thereby making both channels coherent with each other. The output of the timing device 35 feeds a start control circuit 36 which controls the starting of a remote analog computer 37 in synchronism with the generation of the sampling pulses from the output of the individual channels. This is necessary to start the running of the simulation with the generation of the first sample pulse so as to prevent a fraction sampling interval during the first sample period. Before the computer 37 is started all sampling relays and holding relays are energized to clear any initial or residual voltage being held in the sample or hold amplifiers. Clearing can be accomplished manually by having the operator control a manual control switch 38 which operates a clearing network 39. The output of the clearing network 39 feeds a plurality of power amplifier circuits 40, 41, 42, and 43 being used to impulse all sample and hold relays in the various channels. The result is that a sample of zero input information is obtained, thereby clearing the sample and hold channels before beginning the simulation.

For those problems requiring the read-in of a fixed constant value for establishing initial conditions, an initial condition relay 34 is energized to read the initial condition value directly into the associated hold amplifier. The clearing network 39 may consist of a control relay having contacts for applying an operating voltage to the power amplifier circuits 40, 41, 42, and 43. In the normal operation, the start control 36 is programmed to initially operate the clearing network 39 and read in initial conditions before the computer 37 is energized, thereby making the operation more automatic for the more routine sampling problems. For those problems requiring a random sampling rate it is possible for the operator to manually and arbitrarily control the manual control switch 38 and thereby supply the random sampling rate. After the start control 36 has impulsed the clearing network 39, the output of timing device 35 simultaneously starts the analog computer 37 and feeds the high frequency channels of operation 44 and a frequency divider 45. The frequency divider 45 reduces the frequency to a desired repetition frequency which is fed to a junction 46 feeding the low frequency channels.

The driving circuits for the high frequency channels and the low frequency channels are substantially the same and must satisfy the same input and output requirements. For example, the clock pulses from the timing device 35 are reshaped in a pulse shaper before being fed to any of the power amplifiers in order to insure that the sampling and hold relays will stay closed for a period of 10 RC. In the high frequency channels the clock pulse is fed to a hold delay 48 and a pulse shaper 47, which feeds the power amplifier 40 to emit the sample pulse output. The hold delay 48 is longer than the pulse width of the sampling pulse to insure the sample amplifier is not sampling when a hold pulse is sent to the hold amplifier. The output of the hold delay 48 feeds a pulse shaper 49 which feeds the power amplifier 41 to emit the hold pulse output. In the low frequency channels the clock pulse feeds a pulse shaper 50 which feeds the power amplifier 42 to emit the sample pulses. The hold pulses are generated by the clock pulse feeding a hold delay 51 as mentioned above, which feeds a pulse shaper 52 and, in turn, the power amplifier 43.

This completes the embodiment of the invention illustrated herein; however, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. A sampled data simulator comprising:
   a plurality of sample and hold circuits each adapted to be controlled by a sample pulse and a hold pulse respectively,
   timing means for generating a train of clock pulses at a given repetition rate,
   means responsive to said clock pulses for generating a train of sample pulses coherent with said clock pulses, said sample pulses having a pulse width sufficient to allow sampling of an input signal by said sampling circuits,
   means for controlling said sample circuits with said sample pulses,
   means responsive to said clock pulses for generating a train of hold pulses coherent with said clock pulses, said hold pulses being delayed a predetermined time greater than said pulse width of said sample pulse and less than the period time of sample pulses,
   means for controlling said hold circuits with said hold pulses, and
   means for synchronizing the starting of an external signal simulating device with said timing means, whereby said sample and hold pulses are coherent with the starting of said simulating device.

2. A sampled data simulator comprising:
   a plurality of sample and hold circuits, each adapted to be controlled by a sample pulse and a hold pulse respectively,
   timing means for generating a train of clock pulses at a given repetition rate,
   means responsive to said clock pulses for generating a train of sample pulses coherent with said clock pulses, said sample pulses having a pulse width sufficient to allow sampling of an input signal by said sampling circuits,
   means responsive to said clock pulses for generating a delayed train of hold pulses having the same frequency and the same pulse width as said sample pulses, said hold pulses being delayed a predetermined time sufficient for said sampling circuit to have sampled said input information, and
   means for synchronizing the start of an external signal simulating device with said timing means whereby the first of said sample pulses is coherent with the starting of said simulating device.

3. A sampled data simulator comprising:
   a plurality of sample and hold circuits, each adapted to be controlled by a sample pulse and a hold pulse respectively,
   timing means for generating a train of clock pulses at a given repetition rate,
   means responsive to said clock pulses for generating a train of sample pulses coherent with said clock pulses and at the same repetition rate of said clock pulses, said sample pulses having a pulse width sufficient to allow sampling of an input signal by said sampling circuits,
   means responsive to said clock pulses for generating a delayed train of hold pulses having the same frequency and the same pulse width as said sample pulses, said hold pulses being delayed a predetermined time sufficient for said sampling circuit to have sampled said input information, and
   means for synchronizing the starting of an external signal simulating device with said timing means whereby the first of said sample pulses is coherent with the starting of said simulating device.

4. A sampled data simulator comprising:
   a plurality of sample and hold circuits, each adapted to be controlled by a sample pulse and a hold pulse respectively,
   timing means for generating a train of clock pulses at a given repetition rate,
   means responsive to said clock pulses for generating a train of sample pulses coherent with said clock pulses, said sample pulses having a pulse width sufficient to allow sampling of an input signal by said sampling circuits,
   means responsive to said clock pulses for generating a delayed train of hold pulses having the same frequency and the same pulse width as said sample pulses, said hold pulses being delayed a predetermined time sufficient for said sampling circuit to have sampled said input information,
   clearing means connecting all of said sample and hold circuits for simultaneously controlling all of said sample and hold circuits whereby the read-in of initial condition information is controlled, and,
   means for initially energizing said clearing means and synchronizing the starting of an external signal simulating device with said timing means whereby the first of said sample pulses is coherent with the starting of said simulating device.

5. A sampled data simulator comprising:
   a plurality of channels, each channel comprising a sample and hold circuit adapted to be controlled by a sample and hold pulse respectively,
   timing means for generating a train of clock pulses at a given repetition rate,
   means responsive to said clock pulses for generating a train of sample pulses coherent with said clock pulses, said sample pulses having a pulse width sufficient to allow sampling of an input signal by said sampling circuits,
   means for controlling all of said sample circuits in said channels with said sample pulses,
   means responsive to said clock pulses for generating a delayed train of hold pulses having the same frequency and the same pulse width as said sample pulses, said hold pulses being delayed a predetermined time sufficient for said sampling circuit to have sampled said input information, means for controlling all of said hold circuits in all of said channels with said hold pulses, and means for synchronizing the starting of an external signal simulating device with said timing means whereby the first of said sample pulses is coherent with the starting of said simulating device.

6. A sample data simulator comprising:

at least a first and second channel, each of said channels comprising a sample and hold circuit adapted to be controlled by a sample and hold pulse respectively, timing means for generating a train of clock pulses at a given repetition rate, means responsive to said clock pulses for generating a first train of sample pulses coherent with said clock pulses, said sample pulses having a pulse width sufficient to allow sampling of an input signal by said sampling circuits, means for controlling all of said sampling circuits in said first channel with said first train of said sampling pulses, means responsive to said clock pulses for generating a first train of delayed hold pulses having the same frequency and the same pulse width as said first train of sampled pulses, said first train of hold pulses being delayed a predetermined time sufficient for said sampling circuits to have sampled said input information, means responsive to said clock pulses for generating a second train of sample pulses coherent with said clock pulses and at a frequency that is different from said clock pulses, said second train of sample pulses having a pulse width sufficient to allow sampling of an input signal by said sampling circuits, means for controlling all of said sample circuits in said second channel with said second train of said sample pulses, means responsive to said clock pulses for generating a second train of delayed hold pulses having the same frequency and the same pulse width as said second train of sampled pulses, said second train of hold pulses being delayed a predetermined time sufficient for said sampling circuits to have sampled said input information, means for controlling said hold circuits in said second channel with said second train of hold pulses, and means for synchronizing the starting of an external signal simulating device with said timing means, whereby the first pulse of said first train of sample pulses and the first pulse of said second train of sample pulses are coherent with each other and the starting of said simulating device.

No references cited.